United States Patent
Takeo et al.

(10) Patent No.: US 10,246,538 B2
(45) Date of Patent: Apr. 2, 2019

(54) PHOTOCURABLE RESIN COMPOSITION, CURED PRODUCT OF SAME AND METHOD FOR PRODUCING CURED PRODUCT

(71) Applicant: THREE BOND CO., LTD., Hachioji-shi, Tokyo (JP)

(72) Inventors: Yuko Takeo, Hachioji (JP); Naoya Otsuki, Hachioji (JP)

(73) Assignee: THREE BOND CO., LTD., Hachioji-Shi, Tokyo (JP)

( * ) Notice: Subject to any disclaimer, the term of this patent is extended or adjusted under 35 U.S.C. 154(b) by 0 days.

(21) Appl. No.: 15/523,736

(22) PCT Filed: Sep. 2, 2015

(86) PCT No.: PCT/JP2015/075012
§ 371 (c)(1),
(2) Date: May 2, 2017

(87) PCT Pub. No.: WO2016/072142
PCT Pub. Date: May 12, 2016

(65) Prior Publication Data
US 2017/0313801 A1   Nov. 2, 2017

(30) Foreign Application Priority Data

Nov. 4, 2014   (JP) ................................. 2014-224548

(51) Int. Cl.
| C08F 2/48 | (2006.01) |
| C08F 2/44 | (2006.01) |
| C08F 220/18 | (2006.01) |
| C08F 220/36 | (2006.01) |
| C08K 5/18 | (2006.01) |
| C08F 2/50 | (2006.01) |
| C08F 290/06 | (2006.01) |
| C08F 220/34 | (2006.01) |

(52) U.S. Cl.
CPC .............. C08F 220/18 (2013.01); C08F 2/44 (2013.01); C08F 2/48 (2013.01); C08F 2/50 (2013.01); C08F 220/36 (2013.01); C08F 290/067 (2013.01); C08K 5/18 (2013.01); C08F 2220/1875 (2013.01); C08F 2220/346 (2013.01)

(58) Field of Classification Search
CPC ...... C09F 2/44; C09F 2/48; C09F 2/50; C09F 220/18; C09F 220/36; C09F 290/067; C09F 2220/1875; C09F 2220/346; C08K 5/18
USPC .......................................................... 522/75
See application file for complete search history.

(56) References Cited

U.S. PATENT DOCUMENTS

| 4,297,435 A | 10/1981 | Jolly et al. |
| 4,940,647 A | 7/1990 | Frommeld et al. |
| 5,128,235 A * | 7/1992 | Vassiliou .............. G03F 7/0037 264/401 |
| 5,677,107 A * | 10/1997 | Neckers ................ B29C 41/003 264/401 |
| 2010/0160475 A1 | 6/2010 | Stizmann et al. |
| 2017/0283584 A1 | 10/2017 | Takeo et al. |

FOREIGN PATENT DOCUMENTS

| CN | 106715477 A | 5/2017 |
| JP | S56-500054 A | 1/1981 |
| JP | H01-161001 A | 6/1989 |
| JP | H11-060962 A | 3/1999 |
| JP | 2000-273109 A | 10/2000 |
| JP | 2003-171525 A | 6/2003 |
| JP | 2011-522937 A | 8/2011 |
| JP | 2012-167263 A | 9/2012 |
| JP | 2013-082924 A | 5/2013 |
| JP | 2013-194156 A | 9/2013 |
| JP | 2014-025021 A | 2/2014 |
| JP | 2015-131927 A | 7/2015 |

OTHER PUBLICATIONS

International Preliminary Report on Patentability dated May 9, 2017 which issued in the counterpart PCT Patent Application No. PCT/JP2015/075012, including an English translation.
International Search Report and Written Opinion dated Jan. 19, 2016 in PCT Application No. PCT/JP2015/075012.
Extended Supplementary European Search Report dated Jul. 20, 2018, which issued in the counterpart European Patent Application No. 15857313.9.
Chinese Office Action dated Apr. 3, 2018, which issued in corresponding Patent Application No. 2018/032902015320, including English translation.
Chinese Office Action dated Sep. 26, 2018, which issued in the counterpart Chinese Patent Application No. 201580060155.7, including English translation.

* cited by examiner

*Primary Examiner* — Sanza L. McClendon
(74) *Attorney, Agent, or Firm* — Dickinson Wright PLLC

(57) ABSTRACT

The object of the present invention is to provide a photocurable resin composition which allows obtainment of a cured product that has high concealability, while being suppressed in fading due to ultraviolet light, a cured product of the photocurable resin composition, and a method for producing a cured product.
The present invention relates to a photocurable resin composition containing the following component (A) to component (D):
component (A): leuco dye;
component (B): photoacid generating agent;
component (C): radical polymerizable compound; and
component (D): α-hydroxy acetophenone-based radical initiator which has a 5% weight loss temperature (thermal decomposition temperature) in a nitrogen atmosphere of 200° C., or higher as determined by a TGA method at a temperature increase rate, of 10° C./minute.

9 Claims, No Drawings

PHOTOCURABLE RESIN COMPOSITION, CURED PRODUCT OF SAME AND METHOD FOR PRODUCING CURED PRODUCT

TECHNICAL FIELD

The present invention relates to a photocurable resin composition which allows obtainment of a cured product with high concealability, while being suppressed in fading due to ultraviolet light, a cured product of the composition, and a method for producing the cured product.

BACKGROUND ART

Conventionally, photocurable resin compositions with high concealability have been widely used for a material for covering a flexible wire board (see, JP 2013-194156 A), a casting material for a duplicate of a prototype model (see, JP 11-060962 A), a black stripe of a lenticular lens (see, JP 2013-082924 A), and adhesives for assembly of an electronic device or the like (see, JP 2014-025021 A) As a representative method for providing a photocurable resin composition with concealability, a method of blending carbon black as a pigment is mentioned. However, since most of active energy ray such as ultraviolet light is absorbed by carbon black while the concealability is obtained, there is a problem that an occurrence of a poor curability is caused if the pigment concentration is excessively high.

With such background, it is described in JP 11-060962 A that, according to a photosensitive resin composition for casting which contains a photo radical polymerization initiator, a leuco dye, a photoacid generating agent, and an ethylenically unsaturated compound, poor curing is not yielded while the cured product has black color, as it utilizes faster generation speed of "radical species that are generated by light irradiation" than "acids that are generated by light irradiation." Namely, curing is achieved by transmission of light before having the blackening caused by an acid.

SUMMARY OF INVENTION

However, since the black colored cured product of a photosensitive resin composition for casting which is described in JP 11-060962 A has low concealability caused by fading due to ultraviolet light, there has been a problem in terms of its use for various applications.

The present invention is devised under the circumstances described above, and an object of the invention is to provide a photocurable resin composition which allows obtainment of a cured product with high concealability, while being suppressed in fading due ultraviolet light, a cured product of the composition, and a method for producing the cured product.

Gist of the present invention will be described, hereinbelow. Embodiments of the present invention is to solve the aforementioned problems of a relate art. Namely, gist of the present invention is as described below.

The present invention is a photocurable resin composition including the following component (A) to component (D):
component (A): leuco dye;
component (B): photoacid generating agent;
component (C): radical polymerizable compound; and
component (D): α-hydroxy acetophenone-based radical initiator having thermal decomposition temperature of 200° C. or higher.

DESCRIPTION OP EMBODIMENTS

According to one aspect of the present invention, a photocurable resin composition containing the following component (A) to component (D) is provided:
component (A): leuco dye;
component (B): photoacid generating agent;
component (C): radical polymerizable compound; and
component (B): α-hydroxy acetophenone based radical initiator having thermal decomposition temperature of 200° C. or higher.

According to the photocurable resin composition of one aspect of the present invention, a photocurable resin composition which allows obtainment of a cured product with high concealability, while being suppressed in fading due to ultraviolet light, a cured product of the composition, and a method for producing the cured product are provided.

Details of the present invention will be described hereinbelow.

In the present specification, "X to Y" representing a range means "X or more and Y or less." Furthermore, in the present specification, "(meth)acryl" indicates "acryl or methacryl", "(meth)acrylate" indicates "acrylate or methacrylate", and "(meth)acryloyl" indicates "acryloyl or methacryloyl".

<Component (A)>

The leuco dye as the component (A) of the present invention is a compound which shows color exhibition upon contact with an acid, and provides concealability to the cured product. Furthermore, although the leuco dye can show color exhibition including black color, blue color, green color, and red color depending on the type, a leuco dye allowing generation of black color is preferable from the viewpoint of having excellent concealability.

Examples of the component (A) include, although not particularly limited thereto, 3-dibutylamino-6-methyl-7-anilinofluoran, 3-dipropylamino-6-methyl-7-anilinofluoran, 3-diethylamino-6-methyl-7-anilinofluoran, 3-dimethylamino-6-methyl-7-anilinofluoran, 3-diethylamino-6-methyl-7-xylidinofluoran, and 3-(4-diethylamino-2-ethoxyphenyl)-3-(1-ethyl-2-methylindol-3-yl)-4-azaphthalide.
They can be used either singly or as a mixture of two or more kinds thereof. Among them, from the viewpoint of excellent concealability of a cured product, it is preferably 3-dibutylamino-6-methyl-7-anilinofluoran or 3-diethylamino-6-methyl-7-anilinofluoran. Herein, it is more preferable to use only one of 3-dibutylamino-6-methyl-7-anilinofluoran and 3-diethylamino-6-methyl-7-anilinofluoran. Examples of a commercially available product of the component (A) include S-205, BLACK305, ETAC, BLACK100, and NIR BLACK78 (all manufactured by YAMADA CHEMICAL Co., Ltd.), and ODB, ODB-2, ODB-4, ODB-250, and Black-XV (all manufactured by Yamamoto Chemicals Inc.), although not particularly limited thereto.

Blending amount of the component (A) is preferably in a range of 0.01 to 20 parts by mass relative to 100 parts by mass of the component (C) which will be described later. As the component (A) is 0.01 parts by mass or more, the concealability is further enhanced. Furthermore, as it is 20 parts by mass or less, the curing property is further enhanced. From the same point of view, the blending amount of the component (A) is more preferably 0.05 to 10 parts by mass, even more preferably 0.1 to 2 parts by mass, and particularly preferably 0.5 to 1 part by mass.

<Component (B)>

The photoacid generating agent as the component (B) of the present invention is a compound which generates an acid like a Lewis acid and a Broensted acid upon irradiation with active energy ray. Furthermore, it is possible to generate a leuco dye by an acid that is generated by the component (B). Furthermore, from the viewpoint of having both the concealability and photocuring property, it is preferably a photoacid generating agent which has absorption in a wavelength range of 365 nm or higher. Furthermore, an onium-based photoacid generating agent and a non-ionic photoacid generating agent are mainly noted as the component (B). In particular, it is referable to use an onium-based photoacid generating agent.

Examples of the onium salt which may be used in the present invention include, although not particularly limited thereto, an aryliodonium salt, an arylsulfonium salt, and an aryldiazonium salt which have a counter anion like hexafluoroantimonate anion, tetrafluoroborate anion, hexafluorophosphate anion, anion represented by $[PR_a]^-$ (with the proviso that R is each independently a fluorine atom or a fluoroalkyl group, and at least one R is a fluoroalkyl group), anion represented by $[BR_4]^-$ (with the proviso that R is each independently a fluorine atom or a fluoroalkyl group, and at least one R is a fluoroalkyl group), anion represented by $[SbR_6]^-$ (with the proviso that R is each independently a fluorine atom or a fluoroalkyl group, and at least one R is a fluoroalkyl group), hexachloroantimonate anion, trifluoromethanesulfonic acid ion, and fluorosulfonic acid ion. They can be used either singly or as a mixture of two or more kinds thereof. Among them, from the viewpoint of the concealability and photocuring property, an arylsulfonium salt which has any counter anion of hexafluoroantimonate anion, tetrafluoroborate anion, hexafluorophosphate anion, anion represented by $[PR_6]^-$, anion represented by $[BR_4]^-$, and anion represented by $[SbR^4]^-$ is preferable From the viewpoint of having less load on the environment, an arylsulfonium salt which has any counter anion of tetrafluoroborate anion, hexafluorophosphate anion, anion represented by $[PR_6]$, and anion represented by $[BR_4]$ is more preferable. An arylsulfonium salt which has hexafluorophosphate anion as a counter anion is even more preferable, and triarylsulfonium-hexafluorophosphate salt is particularly preferable.

Examples of a commercially available product of the onium-based photoacid generating agent include IRGACURE (registered trademark) 250, IRGACURE (registered trademark) 270 (all manufactured by BASF) WPI-113, WPI-116, WPI169, WPI-170, WPI-124, WPAG-638, WPAG-469, WPAG-370, WPAG-367, and WPAG-336 (all manufactured by Wako Pure Chemical Industries, Ltd.), B2380, B2381, C1390, D2238, D2248, D2253, I0591, T1608, T1609, T2041, and T2042 (all manufactured by Tokyo Chemical Industry Co., Ltd.), AT-6992 and AT-6976 (all manufactured by ACETO), CPI-100, CPI-100P, CPI101A, CPI-200K, and CPI-2105 (all manufactured by San-Apro Ltd-), SP-056, SP-066, SP-130, SP 140, SP-150, SP-170, SP-171, and SP-172 (all manufactured by ADEKA CORPORATION), CD-1010, CD-1011, and CD-1012 (all manufactured by Sartomer), Sanaid (registered trademark) SI 60, SI-80, SI-100, SI 60L, SI-80L, SI-100L, SI-L145, SI-L150, SI-L160, SI-L110, and SI-LI47 (all manufactured by SANS IN CHEMICAL INDUSTRY Co., Ltd.), and PI2074 (manufacture by Rhodia Japan), but not particularly limited thereto.

Examples of the non-ionic photoacid generating agent include a phenacyl sulfone type photoacid generating agent, an o-nitrobenzyl ester type photoacid generating agent, an iminosulfonate type photoacid generating agent, and an N-hydroxyimide sulfonic acid ester type photoacid generating agent, but not limited thereto. They can be used either singly or as a mixture of two or more kinds thereof. Examples of a specific compound of the non-ionic photoacid generating agent include sulfonyl diazomethane, oxime sulfonate, imide sulfonate, 2-nitrobenzyl sulfonate, disulfon, pyrogallol sultanate, p-nitrobenzyl-9,10-dimethoxyanthracene-2-sulfonate, N-sulfonyl-phenylsulfon amide, trifluoromethanesulfonic acid-1,8-naphthalimide, nonafluorobutane sulfonic acid-1,8-naphthalimide, perfluorooctane sulfonic acid-1,8-naphthalimide, pentafluorobenzene sulfonic acid-1,8-naphthalimide, nonafluorobutane sulfonic acid 1,3,6-trioxo-3,6-dihydro-1H-11-thia-azacyclopentaanthracen-2-yl ester, nonaflucrobutane sulfonic acid 8-isopropyl-1,3,6-trioxo-3,6-dihydro-1H-11-thia-2-azacyclopentaanthracen-2-yl ester, 1,2-naphthoquinone-2-diazide-5-sulfonic acid chloride, 1,2-naphthoquinone-2-diazide-4-sulfonic acid chloride, 1,2-benzoquinone-2-diazide-4-sulfonic acid chloride, sodium 1,2-naphthoquinone-2-diazide-5-sulfonic acid, sodium 1,2-naphthoquinone-2-diazide-4-sulfonic acid, sodium 1,2-benzoquinone-2-diazide-4-sulfonic acid, potassium 1,2-naphthoquinone-2-diazide-5-sulfonic acid, potassium 1,2-naphthoquinone-2-diazide-4-sulfonic acid, potassium 1,2-benzoquinone-2-diazide-4-sulfonic acid, methyl 1,2-naphthoquinone-2-diazide-5-sulfonic acid, and methyl 1,2-benzoquinone-2-diazide-4-sulfonic acid.

Examples of a commercially available product of the non-ionic photoacid generating agent include WPAG-145, WPAG-149, WPAG-170, and WPAG-199 (all manufactured by Wako Pure Chemical Industries, Ltd.), D2963, F0362, M1209, and M1245 (all manufactured by Tokyo Chemical Industry Co., Ltd.), SP-082, SP-103, SP 601, and SP 606 (all manufactured by ADEKA CORPORATION), SIN-11 (manufactured by SANBO CHEMICAL IND., LTD.), and NT-1TF (manufactured by San-Apro Ltd).

A preferred blending amount of the component (B) is preferably in a range of 0.1 to 20 parts by mass relative to 100 parts by mass of the component (C) which will be described later. As the component (B) is 0.1 parts by mass or more, the effect of having color exhibition by a leuco dye becomes higher, and thus the concealability is enhanced more. Furthermore, as it is 20 parts by mass or less, the heat resistance of a cured product is further enhanced. From the same point of view, the blending amount of the component (B) is more preferably 0.3 to 10 parts by mass, even more preferably 1 to 6 parts by mass, and particularly preferably 2 to 4 parts bar mass.

Furthermore, it is preferable that the component (B) is 0.1 to 20 parts by mass relative to 1 part by mass of the component (A). The component (B) is even more preferably 1 to 10 parts by mass, still even more preferably 2 to 8 parts by mass, and particularly preferably 3 to 6 parts by mass.

<Component (C)>

As for the radical polymerizable compound as the component (C) of the present invention, a compound having an ethylenically unsaturated group which is commonly used for adhesives, paints, or the like can be used, and specific examples thereof include a compound containing a (meth)acryloyl group. Examples of the component (C) which may be used include a monofunctional, bifunctional, trifunctional, or polyfunctional (meth)acryloyl group-containing monomer and (meth)acryloyl group-containing oligomer. They may be used either singly or as a mixture of two or more kinds thereof.

From the viewpoint of having an excellent photocuring property and physical properties of a cured product, the compound containing a (meth)acryloyl group preferably contains a (meth)acryloyl group-containing oligomer and a (meth)acryloyl group-containing monomer. It is more preferable to use a (meth)acryloyl group-containing oligomer in combination with a monofunctional, bifunctional, trifunctional, or polyfunctional (meth)acryloyl group-containing monomer. It is even more preferable to use a (meth)acryloyl group-containing oligomer in combination with a monofunctional (meth)acryloyl group-containing monomer.

In a case in which a (meth)acryloyl group-containing oligomer and a (meth)acryloyl group-containing monomer are contained as a compound containing a (meth)acryloyl group, it is preferable that the (meth)acryloyl group-containing oligomer is preferably 10 to 90 parts by mass, more preferably 20 to 70 parts by mass, and even more preferably 30 to 50 parts by mass when the total mass of the (meth)acryloyl group-containing oligomer and (meth)acryloyl group-containing monomer is 100 parts by mass.

Examples of the monofunctional monomer include, although not particularly limited thereto, acrylic acid, ethyl (meth)acrylate, n-butyl (meth)acrylate, tert-butyl (meth)acrylate, isobutylmethacrylate, 2-ethylhexyl (meth)acrylate, isodecyl (meth)acrylate, butoxydiethylene glycol (meth)acrylate, methoxypolyethylene glycol (meth)acrylate, 2-methacryloyloxyethylsuccinic acid, 2-methacryloyloxyethylhexahydrophthalic acid, glycidyl (meth)acrylate, lauryl (meth)acrylate, stearyl (meth)acrylate, tetrahydrofurfuryl (meth)acrylate, caprolactone modified tetrahydrofurfuryl (meth)acrylate, cyclohexyl (meth)acrylate, dicyclopentanyl (meth)acrylate, dicyclopentenyl (meth)acrylate, dicyclopentenyloxy(meth)acrylate, isobornyl (meth)acrylate, adamantyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, 4-hydroxybutyl (meth)acrylate, glycerol (meth)acrylate, triflouroethyl (meth)acrylate, methacryloxyoxyethyl acid phosphate, 2-hydroxyethylmethacrylic acid phosphate, γ-methacryloxypropyltrimethoxysilane, γ-acryloxypropyltrimethoxysilane, (meth)acryloylmorpholine, morpholinoethyl (meth)acrylate, dimethylaminoethyl (meth)acrylate, diethylaminoethyl (meth)acrylate, N,N-dimethylaminoethyl (meth)acrylate, and N,N-dimethylaminopropyl (meth)acrylate. From the viewpoint of having excellent compatibility between the component (A) and the component (B) of the present invention and curability, cyclohexyl (meth)acrylate, dicyclopentanyl (meth)acrylate, dicyclopentenyl (meth)acrylate, dicyclopentenyloxy(meth)acrylate, isobornyl (meth)acrylate, adamantyl (meth)acrylate, benzyl (meth)acrylate, phenyl (meth)acrylate, phenoxyethyl (meth)acrylate, 2-hydroxyethyl (meth)acrylate, 2-hydroxypropyl (meth)acrylate, 4-hydroxybutyl (meth)acrylate, (meth)acryloylmorpholine, morpholinoethyl (meth)acrylate, dimethylaminoethyl (meth)acrylate, diethylaminoethyl (meth)acrylate, N,N-dimethylaminoethyl (meth)acrylate, and N,N-dimethylaminopropyl (meth)acrylate are preferable. Isobornyl (meth)acrylate and (meth)acryloylmorpholine more are preferable. Isobornyl acrylate and acryloylmorpholine are even more preferable. Herein, it is still even more preferable to use only one of isobornyl acrylate and acryloylmornholine.

Examples of a commercially available product of the monofunctional monomer include Light acrylate (registered trademark) IBX-A which is manufactured by KYOEISHA CHEMICAL Co., Ltd. and ACMO (registered trademark) which is manufactured by KJ Chemicals Co., Ltd.

Examples of the bifunctional monomer include, although not particularly limited thereto, ethylene glycol di(meth)acrylate, diethylene glycol di(meth)acrylate, triethylene glycol di(meth)acrylate, tetraethylene glycol dimethacrylate, 1,6-hexanediol di(meth)acrylate, 1,9-nonanediol di(meth)acrylate, glycerin di(meth)acrylate, neopentyl glycol di(meth)acrylate, stearic acid modified pentaerythritol di(meth)acrylate, dicyclopentenyl diacrylate, di(meth)acryloylisocyanurate, and alkylene oxide modified bispbenol di(meth)acrylate.

Examples of the trifunctional monomer include, although not particularly limited thereto, trimethylol propane tri(meth)acrylate, pentaerythritol tri(meth)acrylate, and tris(acryloyloxyethyl)isocyanurate.

Examples of the polyfunctional monomer include, although not particularly limited thereto, ditrimethylol propane tetra(meth)acrylate, pentaerythritol tetra(meth)acrylate, dipentaerythritol monohydroxypenta(meth)acrylate, alkyl modified dipentaerythritol pentaacrylate, and dipentaerythritol hexa(meth)acrylate. Those polymerizable monomers may be used either singly or as a mixture of two or more kinds thereof.

Examples of the (meth)acryloyl group-containing oligomer include, although not particularly limited thereto, urethane-based (meth)acrylate, isoprene-based (meth)acrylate, hydrogenated isoprene-based (meth)acrylate, and epoxy (meth)acrylate. Furthermore, as the (meth)acryloyl group-containing oligomer, an acryl polymer containing a (meth)acryl group may be also used. Among them, urethane-based (meth)acrylate is preferable.

Examples of the urethane-based (meth)acrylate include urethane-based (meth)acrylate with polybutadiene skeleton, urethane-based (meth)acrylate with hydrogenated polybutadiene skeleton, urethane-based (meth)acrylate with polycarbonate skeleton, urethane-based (meth)acrylate with polyether skeleton, urethane-based (meth)acrylate with polyester skeleton, and urethane-based (meth)acrylate with castor oil skeleton, Among them, urethane-based (meth)acrylate with polyester skeleton is preferable.

Examples of a commercially available product of the above oligomers include UV-3000B which is manufactured by The Nippon Synthetic Chemical Industry Co., Ltd.

<Component (D)>

The component (D) used in the present invention is an α-hydroxy acetophenone-based radical initiator having thermal decomposition temperature of 200° C. or higher. The component (D) is not particularly limited as long as it is an α-hydroxy acetophenone-based radical initiator having thermal decomposition temperature of 200° C. or higher. Among the photoradical initiators that are present in large number, by selecting the component (D) and combining it with other essential components according to the present invention, the remarkable effect of suppressing the fading of a black cured product caused by ultraviolet light is obtained. Incidentally, the thermal decomposition temperature described in the present invention indicates a temperature at which 5% weight loss is shown in a nitrogen atmosphere according to TGA method employing temperature increase rate of 10° C./minute. From the photocuring property, the component (D) has thermal decomposition temperature of 350° C. or lower. From the viewpoint of the effect of suppressing the fading of a black cured product caused by ultraviolet light and also the photocuring property, the thermal decomposition temperature is preferably 200 to 300° C., and more preferably 200 to 250° C.

Furthermore, from the viewpoint of the concealability, it is preferably a photoradical initiator which has absorption in a wavelength range of 400 nm or higher.

Examples of the component (D) include, although not particularly limited thereto, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, and 2-hydroxy-2-methyl-1-[4-(1-methylvinyl)phenyl]propanone oligomer. Among them, 1-[4-(2-hydroxyethoxy)-phenyl]-2-hydroxy-2-methyl-1-propan-1-one or 2-hydroxy-1-{4-[4-(2-hydroxy-2-methyl-propionyl)-benzyl]phenyl}-2-methyl-propan-1-one is preferable. Herein, it is more, preferable to use only one of 1-[4-(2-hydroxyethoxy)-phenyl]-2-hydroxy-2-methyl-1-propan-1-one and 2-hydroxy-1-{4-[4-(2-hydroxy-2-methyl-propionyl)-benzyl]phenyl}-2-methyl-propan-1-one.

Furthermore, examples of a commercially available product of the component (D) include IRGACURE (registered trademark) 2959, IRGACURE (registered trademark) 127 (all manufactured by BASF), and ESACURE (registered trademark) KIP-150 (manufactured by Lamberti s.p.a.).

A preferred blending amount of the component (D) is preferably in a range of 0.01 to 15 parts by mass relative to 100 parts by mass of the component (C). As the component (D) is 0.01 parts by mass or more, the photocuring property against active energy ray is enhanced more. Furthermore, as it is 15 parts by mass or less, storage stability of the photocurable resin composition is enhanced more. From the same point of view, the blending amount of the component (D) is more preferably 0.1 to 15 parts by mass, even more preferably 0.5 to 10 parts by mass, still even more preferably 1 to 5 parts by mass, and particularly preferably 1 to 3 parts by mass.

For the photocurable resin composition according to one embodiment of the present invention, additives such as a tertiary amine compound, various elastomers such as styrene-based copolymer, a polythiol compound, a sensitizing agent, a filler, a storage stabilizing agent, an anti-oxidant, a light stabilizing agent, a storage stabilizing agent, a heavy metal inactivating agent, an adhesive aid, a plasticizing agent, an anti-foaming agent, a pigment, an anti-corrosive agent, a leveling agent, a dispersing agent, a rheology controlling agent, a flame retardant, or a surface active agent may be used, as long as the purpose of the invention is not impaired by them.

For the photocurable resin composition according to one embodiment of the present invention, a tertiary amine compound may be further added. Examples of the tertiary amine compound include, although not particularly limited thereto, N-phenyl diethanolamine, N-methyl diethanolamine, p-methylphenyl diethanolamine, N-ethyl diethanolamine, N-propyl diethanolamine, N-butyl diethanolamine, triethanolamine, tributanolamine, triisopropanol amine, trimethylamine, triethylamine, tributylamine, N,N'-diethanolamine, N,N'-dimethyl-p-toluidine, N,N'-dimethylaniline, N-methyl diethanolamine, N-methyl dimethanolamine, N,N'-(dimethylamino)ethylmethacrylate, N,N'-dimethylaminoacetophenone, N-dimethylaminobenzophenone, N,N'-diethylaminobenzophenone, N-methylpiperidine, N-ethylpiperidine, dimethylbenzylamine, and N,N-dimethylcyclohexylamine. They can be used either singly or as a mixture of two or more kinds thereof. Among them, N-phenyl diethanolamine, N-methyl diethanolamine, p-methylphenyl diethanolamine, N-ethyl diethanolamine, N-propyl diethanolamine, N-butyl diethanolamine, triethanolamine, tributanolamine, and triisopropanol amine are preferable.

A preferred blending amount of the tertiary amine compound is preferably in a range of 0.01 to 200 parts by mass relative to 100 parts by mass of the component (C). As the blending amount of the tertiary amine compound is 0.01 parts by mass or more, the photocuring property against active energy ray enhanced more. Furthermore, as it is 200 parts by mass or less, concealability of a cured product is enhanced more. From the same point of view, the blending amount of tertiary amine compound is more preferably 0.05 to 150 parts by mass, and even more preferably 0.1 to 100 parts by mass relative to 100 parts by mass of the component (C).

In the photocurable resin composition according to one embodiment of the present invention, a polythiol compound may be further added for the purpose of enhancing the photocuring property. Examples of the polythiol compound include, although not particularly limited thereto, trimethylol propane tris(3-mercaptopropionate), pentaerythritol tetrakis(3-mercaptopropionate), trimethylol propane tris(3-mercaptobutyrate), trimethylol ethane tris(3-mercaptobutyrate), ethylene glycol bis(3-mercaptoglycolate), butanediol bis(3-mercaptoglycolate), trimethylol propane tris(3-mercaptoglycolate), pentaerythritol tetrakis(3-mercaptoglycolate), tris-[(3-mercaptopropionyloxy)-ethyl]-isocyanurate, pentaerythritol tetrakls(3-mercaptopropionate), tetraethylene glycol bis(3-mercaptopropionate), dipentaerythritol hexakis(3-mercaptopropionate), pentaerythritol tetrakis(3-mercaptobutyrate), 1,4-bis (3-mercantobutyryloxy)butane, and 1,3,5-tris(3-mercaptobutyloxyethyl)-1,3,5-triazine-2,4,6(1H,3H,5H)-trione.

The photocurable resin composition according to one embodiment of the present invention may be further added with a sensitizing agent for the purpose of enhancing the photocuring property. Examples of the sensitizing agent include, although not particularly limited thereto, anthracene, pyrene, pyrylene, xanthone, thioxanthone, eosin, ketocoumarine, coumarine, and isobenzofuran.

For the purpose of improving the elasticity, fluidity, or the like of a cured product, the photocurable resin composition according to one embodiment, of the present invention may be further added with a filler to the level at which the storage stability is not impaired by it. Specifically, organic powder, inorganic powder, metallic powder, and the like can be mentioned.

Examples of the filler of inorganic powder include, although not particularly limited thereto, glass, fumed silica, alumina, mica, ceramics, silicone rubber powder, calcium carbonate, aluminum nitride, carbon powder, kaolin clay, dry clay mineral, and dry diatomaceous earth. Blending amount of the inorganic powder is preferably 0.1 to 100 parts by mass or so relative to 100 parts by mass of the component (A). As it is 0.1 parts by mass or more, the effect of improving elasticity, fluidity, or the like of a cured product is high, and as it is 100 parts by mass or less, fluidity of the photocurable resin composition is further improved so that the workability is enhanced more.

Fumed silica is blended for the purpose of controlling the viscosity of the photocurable resin composition or enhancing the mechanical strength of a cured product. Preferably, fumed silica or the like of which surface is treated with dimethylsilane, trimethylsilane, alkylsilane, methacryloxysilane, organochlorosilane, polydimethylsiloxane, hexamethyl disilazane or the like is used. Examples of a commercially available product of the fumed silica include Aerosil (registered trademark) R972, R972V, R972CF, R974, R8975, R976S, R9200, RX50, NAX50, NX90, RX200, RX300, R812, R812S, R8200, RY50, NY50, RY200S, RY200, RY300, R104, R106, R202, R805, R816, T805, R711, RM50, R7200, and the like (all manufactured by Nippon Aerosil Co.).

Examples of the filler of organic powder include, although not particularly limited thereto, polyethylene, polypropylene, nylon, crosslinked acryl, crosslinked polystyrene, polyester, polyvinyl alcohol, polyvinyl butyral, and polycarbonate. Blending amount of the organic powder is preferably 0.1 to 100 parts by mass or so relative to 100 parts by mass of the component (A). As it is 0.1 parts by mass or more, the effect of improving elasticity, fluidity, or the like of a cured product becomes high, and as it is 100 parts by mass or less, fluidity of the photocurable resin composition is further improved so that the workability is enhanced more.

The photocurable resin composition according to one embodiment of the present invention may be further added with a storage stabilizing agent. Examples of the storage stabilizing agent which may be added include, although not particularly limited thereto, a radical absorbing agent such as benzoquinone, hydroquinone, or hydroquinone monomethyl ether, and a metal chelating agent such as ethylene diamine tetraacetic acid or disodium salt thereof, oxalic acid, acetylacetone, or o-aminophenol.

The photocurable resin composition according to one embodiment of the present invention may be further added with an anti-oxidant. Examples of the anti-oxidant include, although not particularly limited thereto, a quinone compound such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butylhydroquinone, p-benzoquinone, 2,5-diphenyl-p-benzoquinone, or 2,5-di-tert-butyl-p-benzoquinone; a phenol compound such as phenothiazine, 2,2-methylene-bis (4-methyl-6-tert-butylphenol), catechol, tert-butyl catechol, 2-butyl-4-hydroxyanisol, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-35-di-tert-pentylphenyl) ethyl]-4,6-di-tert-pentylphenyl acrylate, 4,4'-butylidene bis (6-tert-butyl-3-methylphenol), 4,4'-thiobis(6-tert-butyl-3-methylphenol), 3,9-bis[2-[3-(3-tert-butyl-4-hydroxy-5-methylphenyl) propionyloxy]-1,1-dimethylethyl]-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diyl bis[3-(3,5-di-tert-butyl-4-hydroxyphenyl)propionamide], benzene propanoic acid, 3,5-bis (1,1-dimethylethyl)-4-hydroxy-C7-C9 side chain alkyl ester, 2,4-dimethyl-6 (1-methylpentadecyl)phenol, diethyl [[3,5-bis (1,1-dimethylethyl)-4-hydroxyphenyl]methyl]phosphonate, 3,3',3'',5,5',5''-hexa-tert-butyl-a,a',a''-(mesitylene-2,4, 6-tolyl)tri-p-cresol, calcium diethylbis[[3,5-bis(1,1-dimethylethyl)-4 hydroxyphenyl]methyl]phosohonate, 4,6-bis(octylthiomethyl)-o-cresol, ethylene his (ozyethylene) bis, [3-(5-tert-butyl-4-hydroxy-m-tolyl)propionate], hexamethylene bis[3-(3,5-di-tert-butyl-4 hydroxyphenyl) propionate, 1,3,5-tris(3,5-di-tert-butyl-4-hydroxybenzyl)-1, 3,5-triazine-2,4,6 (1H,3H,5H)-trione, 1,3,5-tris[(4-tert-butyl-3-hydroxy-2,6-xylyl)methyl]-1,3,5-triazine-2,4,6(1H, 3H,5H)-trione, a reaction product between N-phenylbenzene amine and 2,4,6-trimethylpentene, 2,6-di-tert-butyl-4-(4,6-bis(octylthio)1,3,5-triazine-2-ylamino) phenol, picric acid, or citric acid; a phosphorous compound such as tris(2,4-di-tert-butylphenyl)phosphite, tris[2[[2,4,8, 10-tetra-tert-butyl dibenzo[d, f][1,3,2]dioxaphosphepin-6-yl]oxy]ethyl]amine, bis(2,4-di-tert-butylpheny)pentaerythritol diphosphite bis[2,4-bis(1,1-dimethylethyl)-6-methylphenyl]ethyl ester phosphorus acid, tetrakis(2,4-di-tert-butylphenyl) [1,1-bispheny]-4,4'-diyl bisphosphonite, or 6-[3-(3-tert-butyl-4-hydroxy-5-methylphenyl)propoxy]-2,4,8,10-tetra-tert-butyl dibenz[d,f][1,3,2]dioxaphosphepine; a sulfur compound such as dilauryl 3,3'-thiodipropionate, dimyristyl 3,3'-thiodipropionate, distearyl 3,3'-thiodipropionate, pentaerythrityl tetrakis(3-laurylthiopropionate), or 2-mercaptobenzimidazole; an amine compound such as phenothiazine; a lactone compound; and a vitamin E compound. Among them, the phenol compound is preferable.

The photocurable resin composition according to one embodiment of the present invention may be further added with an agent for providing adhesiveness. Examples of the agent for providing adhesiveness which may be added include, although not particularly limited thereto, γ-chloropropyltrimethoxysilane, vinyltrimethoxysilane, vinyltrichlorosilane, vinyltriethoxysilane, vinyl-tris(β-methoxyethoxy)silane, β-(3,4-epoxycyclohexyl) ethyltrimethoxysilane, β-glycidoxypropyltrimethoxysilane, β-mercaptopropyltrimethoxysilane, β-aminopropyltriethoxysilane, N-β-(aminoethyl)-γ-aminopropyltrimethoxysilane, N-β-(aminoethyl)-γ-aminopropylmethyl dimethoxysilane, and γ-ureidopropyltriethoxysilane. Content of the agent for providing adhesiveness is preferably 0.05 to 30 parts by mass, and more preferably 0.2 to 10 parts by mass relative to 100 parts by mass of the component (C).

The photocurable resin composition according to one embodiment of the present invention may be produced by a method that is well known in the art. For example, it can be prepared by blending a predetermined amount of the component (A) to the component (D) and mixing them preferably at a temperature of 10 to 70° C. and preferably for 0.1 to 5 hours by using a mixing means like mixer.

The light source which may be used for curing the photocurable resin composition according to one embodiment of the present invention by irradiation of light including ultraviolet light and visible light is not particularly limited, and examples thereof include a low pressure mercury lamp, a medium pressure medium lamp, a high-pressure mercury lamp, an ultra-high pressure mercury lamp, a black light lamp, a microwave exited mercury lamp, a metal halide lamp, a sodium lamp, a halogen lamp, a xenon lamp, an LED, a fluorescent lamp, sun light, and a device for irradiating electron beam. Amount of light for light irradiation is preferably 10 kJ/m$^2$ or less from the viewpoint of the characteristics of a cured product. It is more preferably 20 kJ/m$^2$ or more.

Another aspect of the present invention is a cured product of the photocurable resin composition according to one aspect of the present invention.

Still another aspect of the present invention is a method for producing a cured product including a curing step for curing the photocurable resin composition according to one aspect of the present invention by light irradiation.

The cured product formed of the photocurable resin composition according to one embodiment of the present invention has high concealability, and it preferably has a black color.

Examples of a use for which the photocurable resin composition according to one embodiment of the present invention is preferably used include, although not particularly limited thereto, a covering material, a resin for casting, a sealing agent, a sealing material, a potting agent, an adhesive, a coating material, a lining material, and ink. Among them, from the viewpoint that it is a photocurable resin composition which is cured by irradiation of active energy ray such as ultraviolet light to give a cured product with high concealability and suppressed in fading due to ultraviolet light, the application for a covering material, a resin for casting, a sealing agent, a potting agent, an adhesive, or a coating material is preferable.

Examples of the particularly preferred use of the photocurable resin composition according to one embodiment of the present invention include a covering material for flexible wire board, a resin for casting, black stripe of a lens, an image display device, an optical member, a CMOS sensor, and an adhesive for assembly of a casing and a lens.

EXAMPLES

The present invention will now be described in greater detail by way of examples, but the present invention is not limited to those examples.

The test methods that are used in Examples and Comparative Examples are as described below.

<Preparation of Photocurable Resin Composition>

Each component was collected in parts by mass that are shown in Table 1, and mixed for 60 minutes at a room temperature using a planetary mixer to prepare a photocurable resin composition. Then, various physical properties were measured as described below. Incidentally, details of the preparation amount are as described in Table 1, and all the numerical values were described in parts by mass.

<Component (A)> a1: 3-dibutylamino-6-methyl-7-anilinofluoran (ODB-2, Yamamoto Chemicals Inc.)

a2: 3-diethylamino-6-methyl-7-anilinofluoran (ODB, Yamamoto Chemicals Inc.)

<Component (B)> b1: triarylsulfonium-hexafluorophosphate salt (CPI-100P, manufactured by San-Apro Ltd.)

<Component (C)> c1: urethane (meth)acrylate (UV-3000B, The Nippon Synthetic Chemical Industry Co., Ltd.)

c2: isobornyl acrylate (Light acrylate (registered trademark) IBX-A, manufactured by KYOEISRA CHEMICAL Co., Ltd.)

c3: acryloylmorpholine (ACMO (registered trademark), manufactured by KJ Chemicals Corporation)

<Component (D)> d1: 1[4-(2-hydroxyethoxy)-phenyl]-2-hydroxy-2-methyl-1-propan-1-one, thermal decomposition temperature of 204° C. (IRGACURE (registered trademark) 2959, manufactured by BASF)

As described herein, the thermal decomposition temperature indicates a temperature at which 5% weight loss is shown in a nitrogen atmosphere according to TGA method using temperature increase rate of 10° C./minute, and the same shall apply hereinbelow.

d2; 2-hydroxy-1-{4-[4-(2-hydroxy-2-methyl-propionyl)-benzyl]phenyl}-2-methyl-propan-1-one, thermal decomposition temperature of 220° C. (IRGACURE (registered trademark) 127, manufactured by BASF)

<Comparative Component of Component (D)> d'1: 2-hydroxy-2-methyl-1-phenyl-propan-1-one, thermal decomposition temperature of 101° C. (DAROCUR (registered trademark) 1173, manufactured by BASF)

d'2: 1-hydroxy-cyclohexyl-phenyl-ketone, thermal decomposition temperature of 155° C. (IRGACURE (registered trademark) 184, manufactured by BASF)

d'3: 2,2-dimethoxy-1,2-diphenylethan-1-one, thermal decomposition temperature of 170° C. (DAROCUR (registered trademark) 651, manufactured by BASF)

d'4: 2-benzyl-2-dimethylamino-1-(4-morpholinophenyl)-butanone-1, thermal decomposition temperature of 248° C. (DAROCUR (registered trademark) 369, manufactured by BASF)

d'5; benzophenone (manufactured by BASF)

The test methods that are described in Examples and Comparative Examples of Table 1 are as follows.

<Determination of Outer Appearance of Cured Product>

Each curable resin composition was flown into a mold with depth of 150 μm to prepare a test specimen with smooth surface and thickness of 150 μm. Subsequently, by using an LED illuminator (wavelength: 365 nm), the test specimen was irradiated with ultraviolet light at conditions of 100 mW/cm$^2$×120 seconds to obtain a cured product. Outer appearance of the cured product was observed with a naked eye, and the results are summarized in Table 1.

<Evaluation of concealability>

By using each curable resin composition and according to the same manner as the preparation of a test specimen for determining the outer appearance of a cured product, a test specimen with smooth surface was prepared to have thickness of 150 μm. Subsequently, by using an LED illuminator (wavelength: 365 nm), the test specimen was irradiated with ultraviolet light at conditions of 100 mW/cm$^2$×120 seconds to obtain a cured product. On a paper recorded with a black spot with diameter of 3 mm, the cured product obtained from above was placed. Then, the black spot was determined with a naked eye, and the evaluation was made based on the following criteria.

[Evaluation Criteria]

○: A case in which contour of the black spot was unclear so that concealability can be confirmed.

X: A case in which contour of the black spot was clearly confirmed.

<Fading Test of Black-Color Cured Product Using Ultraviolet Light>

By using each curable resin composition and according to the same manner as the preparation of a test specimen for determining the outer appearance of a cured product, a test specimen with smooth surface was prepared to have thickness of 150 μm. Subsequently, according to irradiation of ultraviolet light of 120 kJ/m$^2$ (100 mW/cm$^2$×120 seconds), a cured product was obtained.

Subsequently, to determine fading of a cured product caused by ultraviolet light, the cured product was irradiated with ultraviolet light of 1800 kJ/m$^2$ (100 mW/cm$^2$×1800 seconds). In addition, the "cured product before irradiation and the cured product after irradiation" were compared to each other in terms of the outer appearance (color hue) by a naked eye determination, and evaluation thereof was made based on the following evaluation criteria. The results are shown in Table 1.

[Evaluation Criteria]

○: A case in which no fading was confirmed when the "cured product before irradiation" and the "cured product after irradiation" are compared to each other.

X: A case in which fading was clearly confirmed when the "cured product before irradiation" and the "cured product after irradiation" are compared to each other.

TABLE 1

| Component | | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| (A) | a1 | 0.5 | 0.5 | 0.5 | | 1 | 0.5 | 0.5 | 0.5 | 0.5 | 0.5 | 0.5 |
| | a2 | | | | 0.5 | | | | | | | |
| (B) | b1 | 3 | 3 | 3 | 3 | 3 | 3 | 3 | 3 | 3 | 3 | 3 |
| (C) | c1 | 30 | 30 | 30 | 30 | 30 | 50 | 30 | 30 | 30 | 30 | 30 |
| | c2 | 60 | 60 | 60 | 60 | 60 | 40 | 60 | 60 | 60 | 60 | 60 |
| | c3 | 10 | 10 | 10 | 10 | 10 | 10 | 10 | 10 | 10 | 10 | 10 |
| (D) | d1 | 3 | | | 3 | 3 | 3 | | | | | |
| | d2 | | 3 | 1 | | | | | | | | |
| Comparison | d'1 | | | | | | | 3 | | | | |
| | d'2 | | | | | | | | 3 | | | |
| | d'3 | | | | | | | | | 3 | | |
| | d'4 | | | | | | | | | | 3 | |
| | d'5 | | | | | | | | | | | 3 |
| Determination of outer appearance | | Black color | Black color | Black color | Black color | Black color | Black color | Black color | Black color | Black color | Green color | Black color |
| Concealability | | ○ | ○ | ○ | ○ | ○ | ○ | ○ | ○ | ○ | x | ○ |
| Fading test of cured product using ultraviolet light | | ○ | ○ | ○ | ○ | ○ | ○ | x | x | x | Not carried out | x |

According to Table 1, it is found that Examples 1 to 6 which correspond to the present invention give a photocurable resin composition which allows obtainment of a cured product that has high concealability, while being suppressed in fading due to ultraviolet light.

Meanwhile, in Comparative Examples 1 and 2, a photocurable resin composition which contains, as a photoinitiator, α-hydroxy acetophenone based radical initiator having thermal decomposition temperature or lower than 200° C. is used. When compared to Examples of the present invention, fading of a cured product caused by ultraviolet light is confirmed from Comparative Examples 1 and 2, showing a poor property.

Furthermore, Comparative Example 3 relates to photocurable resin composition which contains, as a photoinitiator, 2,2-dimethoxy-1,2-diphenylethan-1-one having thermal decomposition temperature of lower than 200° C. When compared to Examples of the present invention, fading of a cured product caused by ultraviolet light is confirmed from Comparative Example 3, showing a poor property.

Furthermore, in Comparative Example 4, a photocurable resin composition which, contains, as a photoinitiator, 2-benzyl-2-dimethylamino-1-(4-morpholinophenyl)-butanone-1 having thermal decomposition temperature of higher than 200° C. is used. When compared to Examples of the present invention, it was confirmed that Comparative Example 4 has poor concealability.

Furthermore, in Comparative Example 5, a photocurable resin composition which contains, as a photoinitiator, benzophenone is used. Compared to Examples of the present invention, fading of a cured product caused by ultraviolet light is confirmed from Comparative Example 5 showing a poor property.

<Measurement of Transmittance of Cured Product after Irradiation of Ultraviolet Light>

By using each curable resin composition of Examples 1, 2 and 4 and Comparative Example 1 and according to the same manner as the preparation of a test specimen for determining the outer appearance of a cured product, a test specimen with smooth surface was prepared to have thickness of 150 μm. Subsequently, according to irradiation of ultraviolet light of 120 kJ/m$^2$ (100 mW/cm$^2$×120 seconds), a cured product was obtained. Thereafter, to determine any fading of a cured product caused by ultraviolet light, the cured product was irradiated with ultraviolet light of 1800 kJ/m$^2$ (100 mW/cm$^2$×1800 seconds). Transmittance of a cured product after the irradiation was measured by a spectrophotometer UV-2450 (manufactured by Shimadzu Corporation).

The evaluation result of a cured product of the curable resin composition of Examples 1, 2 and 4 exhibited transmittance of 10% or less at a wavelength of 550 nm, and thus excellent concealability was confirmed. On the other hand, the evaluation result of a cured product of the curable resin composition of Comparative Example 1 exhibited transmittance of 30% or more at a wavelength of 550 nm, and thus poor concealability was confirmed.

INDUSTRIAL APPLICABILITY

Since the photocurable resin composition of the present invention allows obtainment of a cured product that has high concealability, while being suppressed in fading due to ultraviolet light, the composition can be preferably used for various adhesive applications. Specifically, the composition is very effective for a covering material, a resin for casting, a sealing agent, a sealing material, a potting agent, an adhesive, a coating material, a lining material, and ink, and can be applied to a wide range of fields, and thus industrially useful.

This application is based on Japanese patent application No. 2014-224548 filed on Nov. 4, 2014, and the disclosed contents thereof are incorporated by reference in its entirety.

The invention claimed is:

1. A photocurable resin composition comprising the following component (A) to component (D):
   component (A): a leuco dye;
   component (B): a photoacid generating agent;
   component (C): a radical polymerizable compound; and
   component (D): an α-hydroxy acetophenone-based radical initiator having thermal decomposition temperature of 200° C. or higher.

2. The photocurable resin composition according to claim 1, wherein the component (D) is comprised at 0.01 to 15 parts by mass relative to 100 parts by mass of the component (C).

3. The photocurable resin composition according to claim 1, wherein the component (D) is 1-[4-(2-hydroxyethoxy)-phenyl]-2-hydroxy-2-methyl-1-propan-1-one or 2-hydroxy-1-{4-[4-(2-hydroxy-2-methyl-propionyl)-benzyl]phenyl}-2-methyl-propan-1-one.

4. The photocurable resin composition according to claim 1, wherein the component (C) comprises a (meth)acryloyl group-containing oligomer and a (meth)acryloyl group-containing monomer.

5. The photocurable resin composition according to claim 1, wherein a cured product has a black color.

6. The photocurable resin composition according to claim 1, wherein the composition is used for a covering material, a resin for casting, a sealing agent, a potting agent, an adhesive, or a coating material.

7. A cured product of the photocurable resin composition according to claim 1.

8. A method for producing the cured product according to claim 7 comprising a curing step for curing the photocurable resin composition by light irradiation.

9. The photocurable resin composition according to claim 1, wherein the component (D) comprises at least one selected from the group consisting of 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, and 2-hydroxy-2-methyl-1-[4-(1-methylvinyl)phenyl]propanone oligomer.

* * * * *